United States Patent
Zhu et al.

(10) Patent No.: US 12,104,939 B2
(45) Date of Patent: Oct. 1, 2024

(54) METHOD FOR ASCERTAINING A PHYSICAL PARAMETER OF A CHARGED LIQUID

(71) Applicant: Endress+Hauser Flowtec AG, Reinach (CH)

(72) Inventors: Hao Zhu, Freising (DE); Alfred Rieder, Landshut (DE); Martin Josef Anklin, Dornach (CH); Reinhard Huber, Bad Säckingen (DE); Yaoying Lin, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 311 days.

(21) Appl. No.: 17/621,306

(22) PCT Filed: May 26, 2020

(86) PCT No.: PCT/EP2020/064591
§ 371 (c)(1),
(2) Date: Dec. 21, 2021

(87) PCT Pub. No.: WO2020/259940
PCT Pub. Date: Dec. 30, 2020

(65) Prior Publication Data
US 2022/0364895 A1 Nov. 17, 2022

(30) Foreign Application Priority Data
Jun. 25, 2019 (DE) .................... 10 2019 117 101.6

(51) Int. Cl.
*G01F 1/84* (2006.01)
*G01N 9/00* (2006.01)

(52) U.S. Cl.
CPC ........... *G01F 1/8427* (2013.01); *G01N 9/002* (2013.01); *G01N 2009/006* (2013.01)

(58) Field of Classification Search
None
See application file for complete search history.

(56) References Cited

U.S. PATENT DOCUMENTS

| 7,412,903 B2* | 8/2008 | Rieder | G01F 1/8413 |
| | | | 73/861.357 |
| 10,598,534 B2* | 3/2020 | Huber | G01F 1/8472 |

(Continued)

FOREIGN PATENT DOCUMENTS

| CN | 101147047 A | 3/2008 |
| CN | 102216739 A | 10/2011 |

(Continued)

*Primary Examiner* — Peter J Macchiarolo
*Assistant Examiner* — Jermaine L Jenkins
(74) *Attorney, Agent, or Firm* — Christopher R. Powers; Endress+Hauser (USA) Holding, Inc.

(57) ABSTRACT

A method for the measurement of a physical parameter of a liquid by means of a sensor having at least one measuring tube for conducting the liquid, wherein the measuring tube can be excited to vibrate in at least one flexural vibration mode, comprises: determining at least one current value of a vibration parameter of the flexural vibration mode; determining a measurement value of the physical parameter according to the current value of the vibration parameter, wherein the measurement value is compensated in respect of the resonator effect according to a current value for the natural frequency of the flexural vibration mode and according to the sound velocity of the liquid conducted in the measuring tube, wherein the value for the sound velocity is provided independently of the vibrations of the measuring tube.

18 Claims, 2 Drawing Sheets

(56) References Cited

U.S. PATENT DOCUMENTS

| | | | |
|---|---|---|---|
| 10,712,189 B2 * | 7/2020 | Zhu | .................. G01N 11/16 |
| 2006/0272428 A1 | 12/2006 | Rieder et al. | |
| 2019/0154486 A1 | 5/2019 | Zhu et al. | |
| 2021/0072062 A1 * | 3/2021 | Chatzikonstantinou | ..................... G01F 1/8477 |

FOREIGN PATENT DOCUMENTS

| | | |
|---|---|---|
| CN | 108603777 A | 9/2018 |
| DE | 102015122661 A1 | 6/2017 |
| DE | 102016005547 A1 | 11/2017 |
| DE | 102016007905 A1 | 1/2018 |
| DE | 102016112002 A1 | 1/2018 |
| DE | 102016114972 A1 | 2/2018 |
| DE | 102016114974 A1 | 2/2018 |

* cited by examiner

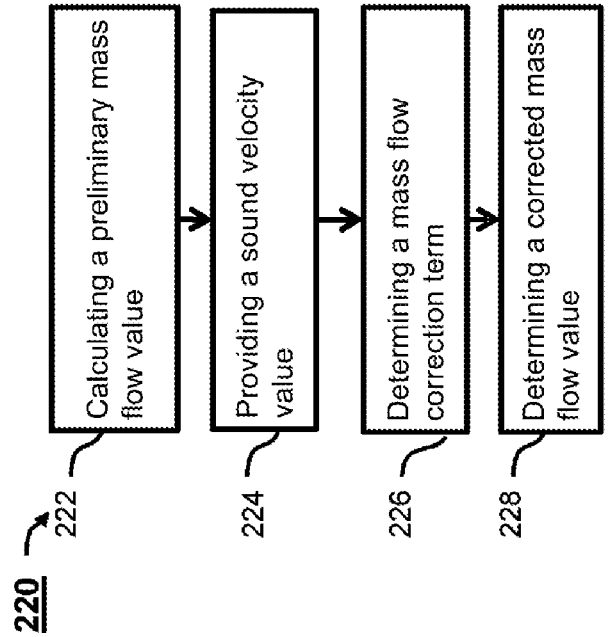
Fig. 3a
Fig. 3b
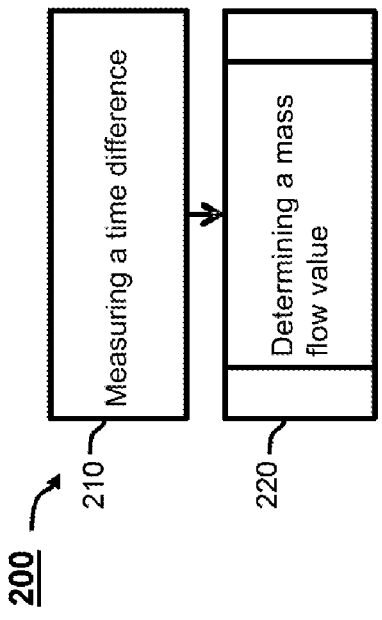
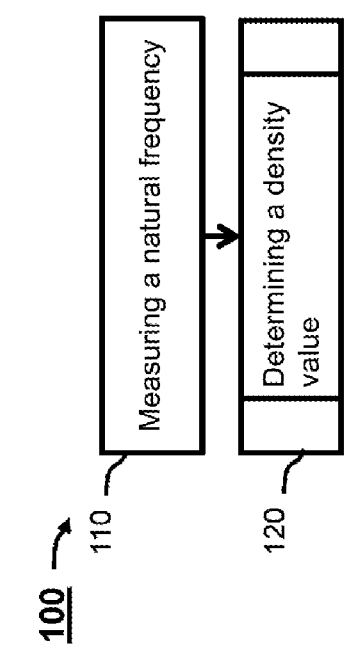
Fig. 2a
Fig. 2b

METHOD FOR ASCERTAINING A PHYSICAL PARAMETER OF A CHARGED LIQUID

CROSS-REFERENCE TO RELATED APPLICATIONS

The present application is related to and claims the priority benefit of German Patent Application No. 10 2019 117 101.6, filed on Jun. 25, 2019, and International Patent Application No. PCT/EP2020/064591, filed on May 26, 2020, the entire contents of which are incorporated herein by reference.

TECHNICAL FIELD

The present invention relates to a method for ascertaining a physical parameter of a liquid by means of a sensor having at least one measuring tube for conducting the liquid, wherein the measuring tube comprises an inlet-side end section and an outlet-side end section, wherein the sensor has at least one inlet-side fastening device and an outlet-side fastening device with which the measuring tube is respectively fastened in one of the end sections, wherein the measuring tube can be excited to vibrate between the two fastening devices, wherein the mass flow rate and density of the liquid can be determined from the vibration behavior of the measuring tube. However, the measurement values for mass flow rate and density have cross-sensitivities with respect to the sound velocity or compressibility of the liquid. Compensation of these cross-sensitivities is therefore desired.

BACKGROUND

The first publication of patent application DE 10 2015 122 661 A1 discloses a method for determining the density or the mass flow rate of a gas-charged liquid by means of a sensor which has a measuring tube with a plurality of flexural vibration modes of different natural frequencies. On the basis of the natural frequencies of two flexural vibration modes, preliminary density values are determined which, assuming resonance vibrations of the gas-charged liquid relative to the measuring tube, enable the determination of the sound velocity and, following this, the determination of a corrected density and mass flow value.

The above approach on the basis of what is known as multi-frequency technology provides satisfactory results where measurements of gas-charged liquids are concerned that have a considerably reduced sound velocity compared to the pure liquid phase. When sound velocities are too high, multi-frequency technology is not feasible.

As requirements for measurement accuracy increase, the resonator effect becomes more important even in the case of media with high sound velocities; it is therefore to be taken into account in measurement value determination for pure liquids as well. It is the object of the present invention to provide a method and a measuring device that correct the effect of the resonator effect also for such media.

SUMMARY

The method according to the invention is a method for determining a measurement value of a physical parameter of a liquid by means of a sensor having at least one measuring tube for conducting the liquid, wherein the measuring tube in each case has an inlet-side end section and an outlet-side end section, wherein the sensor has at least one inlet-side fastening device and an outlet-side fastening device, with which the measuring tube is respectively fastened in one of the end sections, wherein the measuring tube can be excited to vibrate between the two fastening devices in at least one flexural vibration mode, wherein the method comprises the following steps: determining at least one current value of a vibration parameter of the flexural vibration mode; determining a measurement value of the physical parameter as a function of the current value of the vibration parameter, wherein the measurement value is compensated in respect of the resonator effect as a function of a current value for the natural frequency of the flexural vibration mode and of the sound velocity of the liquid conducted in the measuring tube, wherein the value for the sound velocity is provided independently of vibrations of the measuring tube.

In a development of the invention, the vibration parameter comprises the natural frequency of the flexural vibration mode, wherein the physical parameter comprises a density of the liquid conducted in the measuring tube.

In a development of the invention, the vibration parameter comprises a time delay proportional to the mass flow rate between the signals of two vibration sensors arranged offset from one another in the longitudinal direction of the measuring tube, wherein the physical parameter comprises a mass flow rate of the liquid conducted in the measuring tube.

In a development of the invention, a current measurement value for the sound velocity of the liquid is provided by an external sensor, in particular by an ultrasonic sensor.

In a development of the invention, an externally determined value for the sound velocity of the liquid is stored in a data memory and is read out from the data memory in order to calculate the physical parameter.

In a further development of the invention, a measurement value of the physical parameter is determined as a function of the current value of the vibration parameter on the assumption that device parameters that are included in the calculation of the physical parameter are valid, wherein the device parameters were ascertained in particular taking the resonator effect into account.

In a development of the invention, a measurement value of the physical parameter is determined as a function of the current value of the vibration parameter on the assumption that device parameters that are included in the calculation of the physical parameter were determined while disregarding the resonator effect, wherein a correction for the effect of the resonator effect on determining the device parameters takes place.

The relationship of a preliminary density value $\rho_i$ of a fluid on the basis of the natural frequency $f_i$ of an $f_i$-mode is described as:

$$\rho_i = c_{0i} + c_{1i}\frac{1}{f_i^2} + c_{2i}\frac{1}{f_i^4},$$

wherein $c_{0i}$, $c_{1i}$, and $c_{2i}$ are device parameters, here in the form of mode-dependent coefficients.

However, the above approach does not take into account the influences of the resonator effect, i.e., the influence of the vibrating liquid in the measuring tube. The closer the resonance frequency of the vibrating liquid is to the natural frequency of a flexural vibration mode, the stronger will be the influence of the natural frequency. The resonance frequency of the liquid depends on its sound velocity. In a development of the invention, a mode-specific correction term $K_i$ for a preliminary density value is therefore a function of a quotient of the sound velocity of the liquid and the natural frequency of the mode with which the preliminary density measuring value was ascertained.

In a development of the invention, the correction term $K_i$ for the preliminary density values $\rho_i$ has the following form on the basis of the natural frequency of the $f_i$-mode:

$$K_i := \left(1 + \frac{r}{\left(\frac{g \cdot c}{f_i}\right)^2 - b}\right),$$

where $$\rho_{corr} := \frac{\rho_i}{K_i}$$

where r and g are media-independent constants, $f_i$ is the natural frequency of the $f_i$-mode, $\rho_{corr}$ is the corrected density, and b is a scaling constant, wherein in particular: r/b<1, in particular r/b<0.9, and/or b=1. In the above equation, g is in particular a proportionality factor, which is a function of the diameter of the measuring tube, between a resonance frequency $f_{res}$ of the liquid and the sound velocity of the liquid, wherein the following applies:

$$f_{res} = g \cdot c$$

For example, for a twin-tube measuring device with DN 50 or DN 100, g has a value of approximately 21 or 8.5.

The sound velocity c of the liquid can, for example, be stored as a predetermined value, optionally with temperature correction, in a data memory and read out therefrom, or it can be provided by an external sensor, for example an ultrasonic sensor.

In a development of the invention, the following applies to a density error $E_{\rho i}$ of a preliminary density value on the basis of the natural frequency of the $f_i$-mode:

$$E_{\rho i} := K_i - 1,$$

wherein a mass flow rate error $E_m$ of a preliminary mass flow value is proportional to the density error $E_{p1}$ of the preliminary density value based on the flexural vibration mode f1, that is to say:

$$E_m := k \cdot E_{\rho 1},$$

wherein the proportionality factor k is not less than 1.5 and not more than 3. In a currently preferred embodiment of the invention, the proportionality factor is k=2.

The following applies to a correction term $K_m$ for the mass flow rate:

$$K_m := 1 + E_m,$$

hence $$K_m := \left(1 + \frac{2 \cdot r}{\left(\frac{g \cdot c}{f_1}\right)^2 - b}\right)$$

wherein the corrected mass flow rate $\dot{m}_{corr}$ is obtained as $$\dot{m}_{corr} := \frac{\dot{m}_v}{K_m},$$

wherein $\dot{m}_v$ of the preliminary mass flow value is determined in a known manner by multiplying a time delay $\Delta t$ between the signals of two vibration sensors by a calibration factor calf.

Determination of the correction term for the mass flow rate as described here also follows the procedure in multi-frequency technology whereby the mass flow correction term is expediently estimated via the density correction term since the latter has to be determined anyway in order to ascertain the value for the sound velocity of the liquid. However, if the value for the sound velocity is provided externally, the mass flow correction term $K_m$ may also be estimated independently of the density correction term as:

$$K_m := 1 + a_1 \cdot \left(\frac{4\pi \cdot f_c}{c} \cdot r_t\right)^2.$$

In this case, at is a constant, $f_c$ is the vibration frequency at which the measurement was performed, $r_t$ is the radius of the measuring tube or of the measuring tubes, and c is the sound velocity of the medium under consideration.

The above explanations regarding the correction terms $K_i$ and $K_m$ are only valid on the assumption that the resonator effect of the reference medium was taken into account when ascertaining the device parameters $c_{ji}$ If this was not the case, the device parameters $c_{ji}$ or calf will have been determined too low.

Accordingly, according to a development of the invention, the effect of the resonator effect in determining the device parameters has to be corrected subsequently. This can ideally be done using the data of the media used in determining the device parameters. The corresponding initial density correction term $K_{0,i}$ for the $f_i$-mode is to be defined as:

$$K_{0,i} := \left(1 + \frac{r}{\left(\frac{g \cdot c_0}{f_{0,i}}\right)^2 - b}\right),$$

In this case, $c_0$ is the sound velocity of the medium used in determining the coefficients for measuring the density of the medium used and $f_{0,i}$ is the observed natural frequency of the $f_i$-mode. In this case, the corrected density is to be calculated according to:

$$\rho_{corr} = \rho_i \cdot \frac{K_{0,i}}{K_i}$$

The same applies to the mass flow measurement for which a failure to take the resonator effect into consideration when determining the calibration factor calf is to be subsequently corrected.

Two alternatives are available for determining the initial mass flow correction term $K_{0,m}$ as well as for determining the current mass flow correction term $K_m$. Firstly, on the basis of the initial density correction term:

$$K_{0,m} := \left(1 + \frac{2 \cdot r}{\left(\frac{g \cdot c_0}{f_{0,i}}\right)^2 - b}\right),$$

wherein $c_0$ is the sound velocity of the medium used in determining the coefficients for measuring the density of the medium used and $f_{0,i}$ designates the observed natural frequency of the $f_i$-mode.

Secondly, on the basis of the conditions in ascertaining the calibration factor calf:

$$K_{0,m} := 1 + a_1 \cdot \left( \frac{4\pi \cdot f_{0,c}}{c_0} \cdot r_t \right)^2.$$

In this case, $a_1$ is a constant, $f_{0,c}$ is the oscillation frequency at which the measurement was carried out to determine the calibration factor calf, $r_1$ is the radius of the measuring tube or of the measuring tubes, and $c_0$ is the sound velocity of the liquid used in determining the calibration factor.

The following then applies to the corrected mass flow rate:

$$\dot{m}_{corr} = \dot{m}_v \cdot \frac{K_{0,m}}{K_m}.$$

where $K_m$ is the current mass flow correction term, $K_{0,m}$ is one of the two initial mass flow correction terms and $\dot{m}_v$ is the preliminary mass flow measurement value.

The apparatus according to the invention serves to ascertain a measurement value of a physical parameter of a liquid, especially by means of the method according to the invention, wherein the apparatus comprises a sensor having at least one measuring tube for conducting the liquid, wherein the measuring tube in each case has an inlet-side end section and an outlet-side end section, wherein the sensor has at least one inlet-side fastening device and one outlet-side fastening device with which the measuring tube is in each case fastened in one of the end sections, wherein the measuring tube can be excited to vibrate between the two fastening devices in at least one flexural vibration mode, at least one exciter for exciting vibrations in at least one flexural vibration mode, at least one vibration sensor for detecting vibrations in at least one flexural vibration mode, wherein the measuring device further comprises an operating and evaluation circuit configured to: drive the exciter; acquire signals of the at least one vibration sensor; determine at least one current value of a vibration parameter of the flexural vibration mode on the basis of the sensor signals; and determine a measurement value of the physical parameter as a function of the current value of the vibration parameter, wherein an operating and evaluation circuit, which is configured to compensate the measurement value in respect of the resonator effect as a function of a current value for the natural frequency of the flexural vibration mode and of the sound velocity of the liquid conducted in the measuring tube, wherein the value for the sound velocity is provided independently of vibrations of the measuring tube.

BRIEF DESCRIPTION OF THE DRAWINGS

The invention will now be described in greater detail on the basis of the exemplary embodiment shown in the figures. The following are shown:

FIG. 2a shows a flow diagram of a first exemplary embodiment of the method for density measurement according to the present disclosure;

FIG. 2b shows a flow diagram with sub-steps of the first exemplary embodiment of the method according to the present disclosure;

FIG. 3a shows a flow diagram of a second exemplary embodiment of the method according to the invention for mass flow measurement; and FIG. 3b shows a flow diagram with sub-steps of the second exemplary embodiment of the method according to the present disclosure.

DETAILED DESCRIPTION

Figure 1:
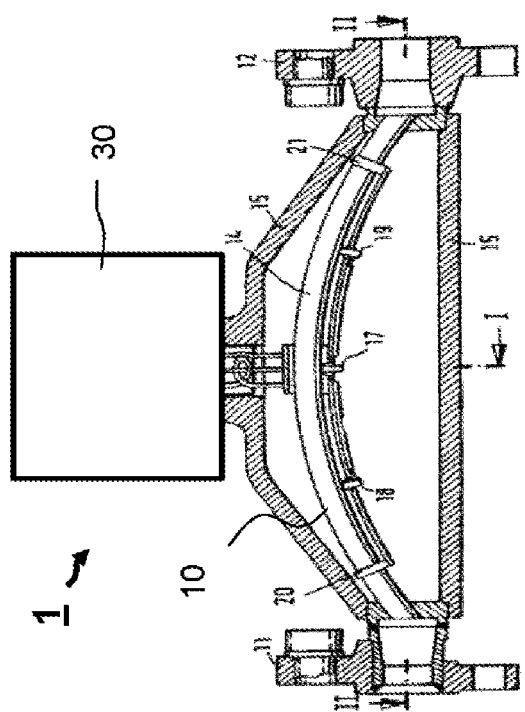
FIG. 1 shows a schematic representation of an exemplary embodiment of a measuring device according to the present disclosure.

The exemplary embodiment of a measuring device 1 according to the invention shown in FIG. 1 comprises an oscillator 10 which comprises a pair of oscillatory measuring tubes 14 which run parallel and extend between an inlet-end flange 11 and an outlet-end flange 12, wherein the flanges each comprise a flow divider or collector into which the measuring tubes 14 open. The flow dividers are connected to one another by a rigid housing 15 so that oscillations of the flow dividers accommodating the measuring tubes are effectively suppressed in the range of oscillation frequencies of useful bending vibration modes of the oscillator. The measuring tubes 14 are rigidly connected to an inlet-side node plate 20 and an outlet-side node plate 21, wherein the node plates define oscillation nodes of the oscillator 10 formed by the two measuring tubes 14, and thus largely define the frequencies of the useful flexural vibration modes except for the density dependency. The oscillator 10 is excited to oscillate by an electrodynamic exciter 17 acting between the two measuring tubes 14, wherein the oscillations are detected by means of two oscillation sensors 18, 19 capturing relative movements of the measuring tubes 14 with respect to each other. The exciter 17 is operated by an operation and evaluation circuit 30, wherein the latter also captures and evaluates the signals from the oscillation sensors in order to determine a density or mass flow value corrected in relation to the resonator effect.

The effect of the resonator effect will now be explained in more detail on the basis of the density measurement for two media, namely water and carbon tetrachloride.

The relationship of a preliminary density value $\rho_i$ of a fluid on the basis of the natural frequency $f_i$ of an $f_i$-mode is described as:

$$\rho_i = c_{0i} + c_{1i} \frac{1}{f_i^2} + c_{2i} \frac{1}{f_i^4},$$

where $c_{0i}$, $c_{1i}$, and $c_{2i}$ are device-specific mode-dependent coefficients. The above coefficients are usually initially determined immediately following production of the measuring devices, wherein the vibration frequencies of the flexural vibration modes, in particular for the f1 mode, are determined for media of known density. Air at normal pressure and 20° C. and water at 20° C. are frequently used as the media.

Table 1 shows the observed frequencies of the f1 mode of an exemplary measuring device for these media and for carbon tetrachloride.

TABLE 1

| Medium | Density: [kg/m3] | f1 [Hz] | c [m/s] | f0 [Hz] | f1 apparent density [kg/m3] | Resonator effect [kg/m3] | Density error [kg/m3] |
|---|---|---|---|---|---|---|---|
| Air at 20° C. | 1.2 | 300 | 340 | 1994 | 1.22 | 0.02 | 0.00 |
| Water at 20° C. | 1000 | 250 | 1482 | 8689 | 1000.69 | 0.69 | 0.00 |
| CCl$_4$ at 20° C. | 1590 | 230.057 | 926 | 5429 | 1592.39 | 2.39 | 1.30 |

Table 1 also indicates the density, the sound velocity c, and the resulting resonance frequency for the medium vibrating against the measuring tube. An apparent density value is given In the "f1 apparent density" column, which density value would result due to the f1 frequency in a measuring device for which the resonator effect had been taken into account in the initial determination of the coefficients if the resonator effect is disregarded in the current density measurement. The contribution of the resonator effect to the apparent density is specified in the "resonator effect" column.

The "density error" column summarizes the situation of the prior art, according to which the resonator effect is disregarded not only in the initial determination of the coefficients $c_{0i}$, $c_{1i}$, and $c_{2i}$ but also in the density measurement. The coefficients are rather selected such that the target density of 1.2 kg/m^3 for air and the target density of 1000 kg/m^3 for water are obtained. The measurement error for these two media is thus zero, while for carbon tetrachloride it is 1.3 kg/m^3.

Table 2 shows the coefficients $c_{0i}$ to $c_{2i}$ for determining the density obtained on the basis of the natural frequency of the first flexural vibration mode without taking into account the resonator effect, wherein the relationship of a preliminary density value $\rho_i$ of a liquid based on the natural frequency $f_i$ of an $f_i$-mode is given here as:

$$\rho_i = c_{0i} + c_{1i}\frac{1}{f_i^2} + c_{2i}\frac{1}{f_i^4}$$

Insofar as the density values of air and water were prespecified as reference densities during the calibration, the values of a measured apparent or preliminary density match the target value for density for these two media. However, for carbon tetrachloride, there is a deviation of 1.3 kg/m^3. If the influence of the resonator effect on the initial calibration is taken into account and used for subsequent correction by means of an initial density correction term $K_{0i}$ and additionally included in the correction of the current density measurement by means of a density correction term $K_i$, it will be possible to determine a correct media density, as indicated in the last column of Table 2.

TABLE 2

| Medium | c01 | c11 | c21 | Measured apparent density [kg/m3] | Subsequent correction [kg/m3] |
|---|---|---|---|---|---|
| Air at 20° C. | −2268.8 | 2.06E+08 | −87156.2 | 1.2 | |
| Water at 20° C. | | | | 1000 | |
| Carbon tetrachloride at 20° C. | | | | 1591.3036 | 1590.013265 |

The density correction term $K_i$ for the preliminary or apparent density values $\rho_i$ on the basis of that of the natural frequency of the $f_i$-mode has the following form:

$$K_i := \left(1 + \frac{r}{\left(\frac{g \cdot c}{f_i}\right)^2 - b}\right),$$

where r and g are media-independent constants, $f_i$ is the natural frequency of the $f_i$-mode, $\rho_{corr}$ is the corrected density, and b is a scaling constant, wherein in particular: r/b<1, in particular r/b<0.9, and/or b=1. In the above equation, g is a proportionality factor, which is in particular a function of the diameter of the measuring tube, between a resonance frequency $f_{res}$ of the liquid and the sound velocity of the liquid, wherein the following applies:

$$f_{res} = g \cdot c$$

The sound velocity c of the liquid can, for example, be stored as a prespecified value, optionally with temperature correction, in a data memory and read out therefrom.

The corresponding initial density correction term $K_{0,i}$ for the $f_i$-mode is to be determined as:

$$K_{0,i} := \left(1 + \frac{r}{\left(\frac{g \cdot c_0}{f_{0,i}}\right)^2 - b}\right),$$

In this case, $c_0$ is the sound velocity of the medium used in determining the coefficients for measuring the density of the medium used and $f_{0,i}$ is the observed natural frequency of the $f_i$-mode.

In this case, the subsequently corrected density is to be calculated according to:

$$\rho_{corr} = \rho_i \cdot \frac{K_{0,i}}{K_i}$$

Finally Table 3 shows the coefficients $c_{01\_sos}$ to $c_{21\_sos}$ for determining the density obtained on the basis of the natural frequency of the first flexural vibration mode taking into account the resonator effect.

In this case, disregarding the resonator effect during measurement operation leads to considerable errors in the preliminary density $\rho_i$.

TABLE 3

| Medium | c01_sos | C11_sos | C21_sos | Preliminary density [kg/m3] | Corrected density [kg/m3] |
|---|---|---|---|---|---|
| Air at 20° C. | −2270.3 | 2.06E+08 | −87214.7 | 1.2232734 | 1.200 |
| Water at 20° C. | | | | 1000.6934 | 1000.000 |
| Carbon tetrachloride at 20° C. | | | | 1592.3937 | 1590.000 |

In this case, the corrected density $\rho_{corr}$ is to be determined according to:

$$\rho_{corr} := \frac{\rho_i}{K_i}$$

wherein the density correction term $K_i$ as previously given is as:

$$K_i := \left(1 + \frac{r}{\left(\frac{g \cdot c}{f_i}\right)^2 - b}\right).$$

Agreement between the corrected density values and the values in the literature is very good.

A first exemplary embodiment 100 of the method according to the invention is described with reference to the flow diagrams in FIGS. 2a and 2b, wherein the exemplary embodiment 100 serves for density measurement.

In a first step 110, as shown in FIG. 2a, a current value of the natural frequency of the basic flexural vibration mode or f1 mode is determined.

In a second step 120, a density measurement value is determined as a function of the current value of the natural frequency vibration parameters.

The second step 120 comprises the sub-steps shown in FIG. 2b.

Firstly, in a first sub-step 122, a preliminary density measurement value $\rho_i$ is determined on the basis of the current value of the natural frequency $f_1$.

In the device used in this exemplary embodiment, the coefficients $c_{01\_sos}$ to $c_{21\_sos}$ were obtained taking into account the resonator effect. In measuring mode, therefore, corrections only need to be made for the resonator effect in the current measurement. For this purpose, in a second sub-step 124, a value for the sound velocity of the liquid currently conducted in the measuring tube is provided, for example from a data memory.

In a third sub-step 126, the density correction term $K_1$ is determined on the basis of the value for the natural frequency f1 and the sound velocity c of the liquid.

Finally, in a fourth sub-step 128, a corrected density measurement value $\rho_{corr}$ is calculated by dividing the preliminary density measurement value $\rho_1$ by $K_1$.

If the coefficients $c_{01}, c_{11}, c_{21}$ were not determined taking into account the resonator effect, then multiplication by an initial density correction term $K_{0,1}$ will still need to be carried out in order to subsequently compensate for this error.

A second exemplary embodiment 200 of the method according to the invention is described with reference to the flow diagrams shown in FIGS. 3a and 3b, wherein the exemplary embodiment 200 serves for mass flow measurement.

In a first step 210, as shown in FIG. 3a, a current value of the time delay Δt proportional to the mass flow rate is ascertained between the rest position passages of two vibration sensors on the measuring tube.

In a second step 220, the mass flow measurement value is determined as a function of the current value of the time delay.

The second step 220 comprises the sub-steps shown in FIG. 3b.

Firstly, in a first sub-step 222, on the basis of the current value of the time delay Δt a preliminary mass flow value $\dot{m}_v$ is determined by multiplying by a calibration factor calf. In the device used in this exemplary embodiment, the calibration coefficient calf was obtained taking into account the resonator effect.

In measuring mode, therefore, corrections only need to be made for the resonator effect in the current measurement.

For this purpose, in a second sub-step 224, a value for the sound velocity c of the liquid currently conducted in the measuring tube is provided, for example from a data memory.

In a third sub-step 226, the mass flow correction term $K_m$ is determined on the basis of the value for the natural frequency fc at which the flow measurement takes place and the sound velocity c of the liquid according to:

$$K_m := 1 + a_1 \cdot \left(\frac{4\pi \cdot f_c}{c} \cdot r_t\right)^2,$$

where $a_1$ is a constant and $r_t$ is the radius of the measuring tube or of the measuring tubes.

Finally, in a fourth sub-step 228, a corrected mass flow value $\dot{m}_{corr}$ is calculated by dividing the preliminary mass flow value $\dot{m}_v$ by $K_m$, i.e.:

$$\dot{m}_{corr} := \frac{\dot{m}_v}{K_m}.$$

If the calibration factor calf was not determined taking into account the resonator effect, then multiplication by an initial mass flow correction term $K_{0,m}$ will also need to take place in order to subsequently compensate for this error.

The invention claimed is:

1. A method for determining a measurement value of a physical parameter of a liquid using a sensor having a measuring tube for conducting the liquid, wherein the measuring tube is operable to be excited to vibrate in a flexural vibration mode, the method comprising:
   conducting the liquid in the measuring tube;
   determining a current value of a vibration parameter of the flexural vibration mode;

determining a measurement value of the physical parameter as a function of the current value of the vibration parameter; and compensating the measurement value with respect to a resonator effect as a function of a current value for a natural frequency of the flexural vibration mode and of a sound velocity of the liquid conducted in the measuring tube, wherein a value for the sound velocity of the liquid is provided independently of the vibrations of the measuring tube.

2. The method according to claim 1, wherein the physical parameter is a density or a mass flow value of the liquid conducted in the measuring tube, wherein the associated vibration parameter is a vibration frequency or a time delay proportional to the mass flow rate between signals of two vibration sensors arranged offset from one another in a longitudinal direction of the at least one measuring tube.

3. The method according to claim 1,
wherein the value for the sound velocity of the liquid is provided by an external sensor, or an externally determined value for the sound velocity of the liquid is stored in a data memory and is read out from the data memory to calculate the physical parameter.

4. The method according to claim 1, wherein a density correction term $K_i$ for a preliminary density value $\rho_i$ has the following form on the basis of that of the natural frequency of an $f_i$-mode:

$$K_i := \left(1 + \frac{r}{\left(\frac{g \cdot c}{f_i}\right)^2 - b}\right),$$

wherein: r and g are media-independent constants; $f_i$ is a natural frequency of the $f_i$ mode; b is a scaling constant such that r/b<1 and/or b=1; g is a proportionality factor that is a function of a diameter of the measuring tube between a resonance frequency $f_{res}$ of the liquid and the sound velocity c of the liquid such that $f_{res}$=g·c.

5. The method according to claim 4, wherein the following applies to a density error $E_{\rho i}$ of the preliminary density value $\rho_i$ on the basis of the natural frequency of the $f_i$-mode:

$$E_{\rho i} := K_i - 1,$$

wherein a mass flow rate error $E_m$ of a preliminary mass flow value is proportional to the density error $E_{\rho i}$ of the preliminary density value based on the flexural vibration mode f1:

$$E_m := k \cdot E_{\rho 1},$$

wherein the proportionality factor k is not less than 1.5 and not more than 3, wherein a mass flow correction term $K_m$ is determined as:

$$K_m := 1 + E_m.$$

6. The method according to claim 5, wherein a corrected mass flow value $\dot{m}_{corr}$ is determined as $$\dot{m}_{corr} = \frac{\dot{m}_v}{K_m},$$

wherein a preliminary mass flow value $\dot{m}_v$ is determined by multiplying a time flow-proportional delay $\Delta t$ between the signals of two vibration sensors by a calibration factor calf.

7. The method according to claim 5, wherein a mass flow correction term $K_m$ is estimated as:

$$K_m := 1 + a_1 \cdot \left(\frac{4\pi \cdot f_c}{c} \cdot r_t\right)^2,$$

wherein $a_1$ is a constant, $f_c$ is the vibration frequency at which the flow rate measurement was performed, $r_t$ is the radius of the measuring tube or of the measuring tubes, and c is a value for the sound velocity of the liquid contained in the measuring tube.

8. The method according to claim 7, wherein a corrected mass flow value $\dot{m}_{corr}$ is determined as $$\dot{m}_{corr} = \frac{\dot{m}_v}{K_m},$$

wherein a preliminary mass flow value $\dot{m}v$ is determined by multiplying a time flow-proportional delay $\Delta t$ between the signals of two vibration sensors by a calibration factor calf.

9. The method according to claim 4, wherein a corrected density value $\rho_{corr}$ is determined as:

$$\rho_{corr} = \frac{\rho_i}{K_i}.$$

10. The method according to claim 4, wherein an initial density correction term $K_{0,i}$ for the $f_i$-mode is to be determined as:

$$K_{0,i} := \left(1 + \frac{r}{\left(\frac{g \cdot c_0}{f_{0,i}}\right)^2 - b}\right),$$

wherein $c_0$ is the sound velocity of the medium used in determining the coefficients for measuring the density of the medium used and $f_{0,i}$ designates the observed natural frequency of the fi mode.

11. The method according to claim 10, wherein the corrected density is calculated according to:

$$\rho_{corr} = \rho_i \cdot \frac{K_{0,i}}{K_i}.$$

12. The method according to claim 4, wherein an initial mass flow correction term $K_{0,m}$ is calculated according to:

$$K_{0,m} := \left(1 + \frac{2 \cdot r}{\left(\frac{g \cdot c_0}{f_{0,i}}\right)^2 - b}\right),$$

wherein $c_0$ is the sound velocity of the medium used in determining the coefficients for measuring the density of the medium used and $f_{0,i}$ designates the observed natural frequency of the $f_i$-mode.

13. The method according to claim 12, wherein a corrected mass flow measurement value is calculated according to:

$$\dot{m}_{corr} = \dot{m}_v \cdot \frac{K_{0,m}}{K_m},$$

wherein $K_m$ is the current mass flow correction term, $K_{0,m}$ is the initial mass flow correction term and $\dot{m}_v$ is a preliminary mass flow value determined by multiplying a time flow-proportional delay $\Delta t$ between the signals of two vibration sensors by a calibration factor calf.

14. The method according to claim 1, wherein a measurement value of the physical parameter is determined as a function of the current value of the vibration parameter on the assumption that device parameters included in the calculation of the physical parameter were determined taking the resonator effect into account.

15. The method according to claim 1, wherein a measurement value of the physical parameter is determined as a function of the current value on the assumption that device parameters included in the calculation of the physical parameter were determined while disregarding the resonator effect, wherein a correction is made for the effect of the resonator effect on the determination of the device parameters.

16. The method according to claim 1, wherein an initial mass flow correction term $K_{0,m}$ is calculated according to:

$$K_{0,m} := 1 + a_1 \cdot \left( \frac{4\pi \cdot f_{0,c}}{c_0} \cdot r_t \right)^2,$$

wherein $a_1$ is a constant, $f_{0,c}$ is the oscillation frequency at which the measurement was carried out to determine the calibration factor calf, $r_t$ is the radius of the measuring tube, and $c_0$ is the sound velocity of the liquid used in determining the calibration factor.

17. The method according to claim 16, wherein a corrected mass flow measurement value is calculated according to:

$$\dot{m}_{corr} = \dot{m}_v \cdot \frac{K_{0,m}}{K_m},$$

wherein $K_m$ is the current mass flow correction term, $K_{0,m}$ is the initial mass flow correction term and $\dot{m}_v$ is a preliminary mass flow value determined by multiplying a time flow-proportional delay $\Delta t$ between the signals of two vibration sensors by a calibration factor calf.

18. A measuring device for determining a measurement value of a physical parameter of a liquid, the measuring device comprising:

a sensor having:

a measuring tube for conducting the liquid, wherein the measuring tube has an inlet-side end section and an outlet-side end section;

an inlet-side fastening device and an outlet-side fastening device with which the measuring tube is fastened in one of the respective end sections, wherein the measuring tube is embodied to be excited to vibrate between the two fastening devices in at least one flexural vibration mode;

an exciter for exciting vibrations of the measuring tube in at least one vibration mode; and a vibration sensor for detecting vibrations in the at least one flexural vibration mode; and an operating and evaluation circuit configured to:

drive the exciter;

capture signals of the at least one vibration sensor;

determine at least one current value of a vibration parameter of the flexural vibration mode on the basis of the sensor signals; and determine a measurement value of the physical parameter as a function of the current value of the vibration parameter, wherein the operating and evaluation circuit is configured to compensate the measurement value with respect to a resonator effect as a function of a current value for a natural frequency of the at least one flexural vibration mode and of the sound velocity of the liquid conducted in the measuring tube, wherein the value for the sound velocity is provided independently of the vibrations of the measuring tube.

\* \* \* \* \*